Oct. 20, 1959

A. DE HERTELENDY 2,909,145

GRAVITY PROPELLED VEHICLE

Filed Oct. 14, 1955

INVENTOR.
ANDOR de HERTELENDY
BY
Carl Miller
ATTORNEY

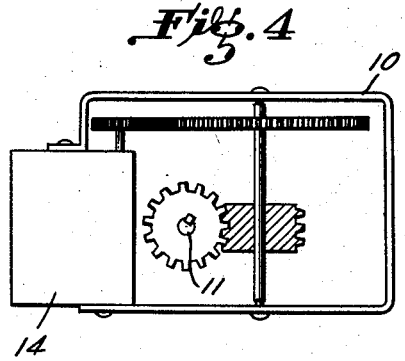
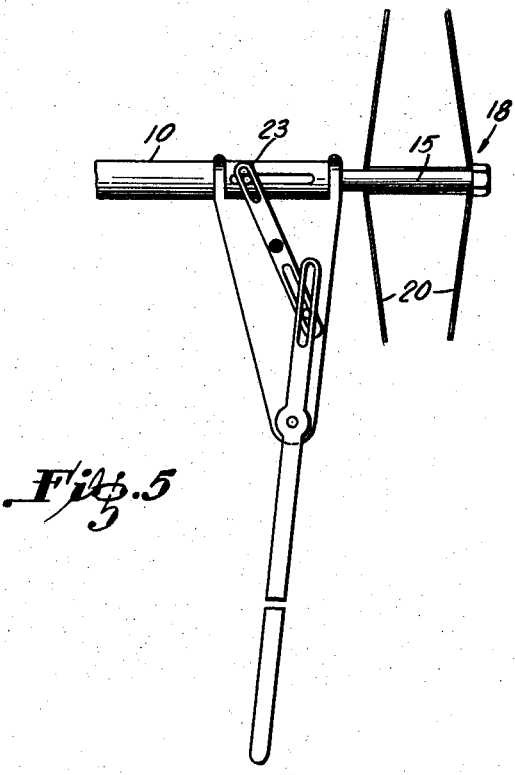
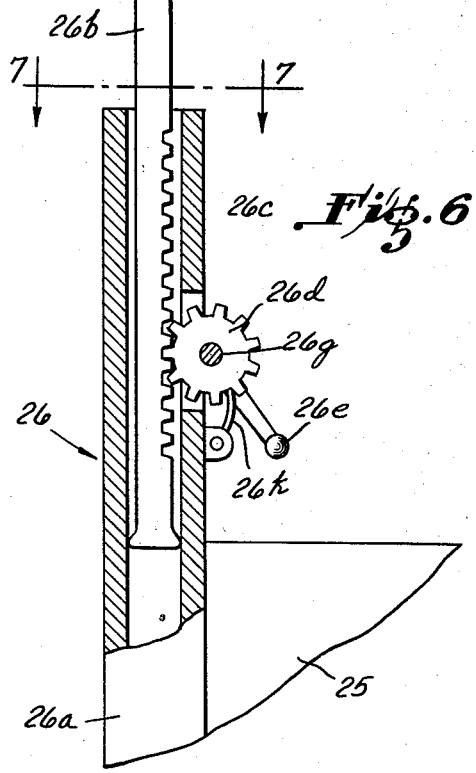
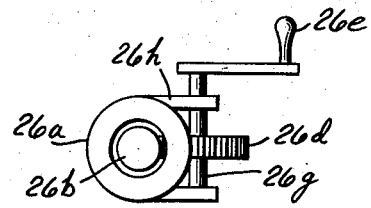

United States Patent Office 2,909,145
Patented Oct. 20, 1959

2,909,145

GRAVITY PROPELLED VEHICLE

Andor de Hertelendy, New York, N.Y.

Application October 14, 1955, Serial No. 540,487

5 Claims. (Cl. 115—1)

This invention relates to vehicles.

It is an object of the present invention to provide a vehicle, the motion of which is imparted by direct action of the force of gravity.

It is another object of the present invention to provide a gravity propelled vehicle of the above type wherein the mode of propulsion, the vehicle's small weight and large sized wheels make it nearly independent of the nature of the travelled surface and permit it to be used equally well on roadless, uneven ground, on sand, snow, ice and on bodies of water.

Other objects of the invention are to provide a gravity propelled vehicle bearing the above objects in mind which is of simple construction, has a minimum number of parts, is inexpensive to manufacture and efficient in operation.

For other objects and a better understanding of the invention, reference may be had to the following detailed description taken in connection with the accompanying drawing, in which:

Fig. 4 is an enlarged cross-sectional view taken along line 4—4 of Figure 1;

Fig. 5 is a fragmentary elevational view of other parts of the mechanism shown in Figure 3;

Fig. 6 is a fragmentary side elevational view, partly broken away, of a length adjustment mechanism; and Fig. 7 is a cross sectional view taken along line 7—7 of Figure 6.

Figure 1:
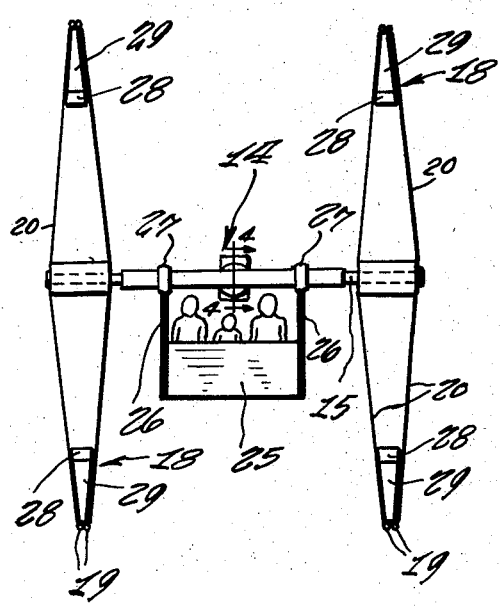
Figure 1 is a front elevational view of a preferred embodiment of the present invention.
Figure 2:
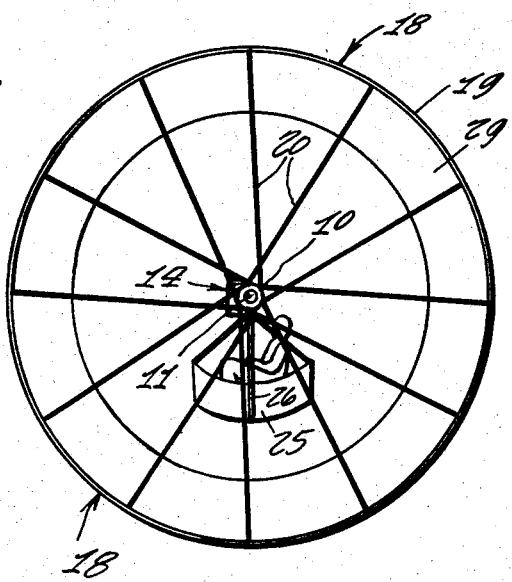
Fig. 2 is a side elevational view thereof.

Referring now more in detail to the drawing, 10 represents a hollow cylindrical transverse tube which rotatably mounts therewithin the horizontal shaft 11 by means of the ball bearing assemblies 12, the ends of the shaft 11 extending beyond the ends 13 of the hollow casing 10. An internal combustion engine 14 is fixedly mounted at the center of the casing 10 and by suitable spur and worm gearing, as shown in Figure 4 is adapted to drive the shaft 11 therewithin. Instead of the motor 14, any other source of power may be employed including a manual type arrangement.

Figure 3:
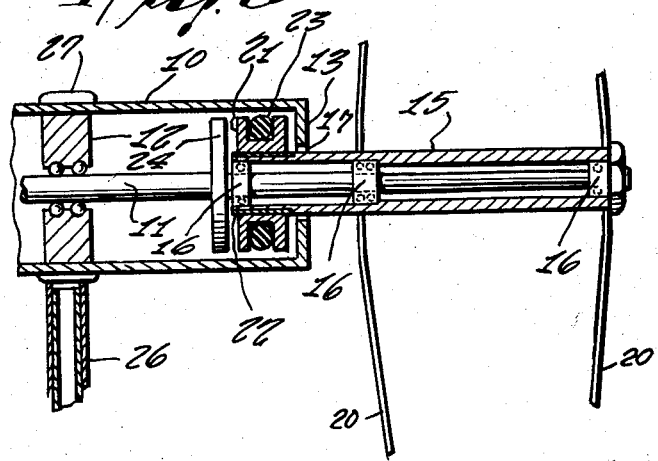
Fig. 3 is a fragmentary enlarged vertical sectional view through a portion of the vehicle.

A pair of hubs 15 is rotatably mounted on the ends of the shaft 11 by means of the ball bearing assemblies 16, the inner ends of the hubs 15 extending inwardly through the openings 17 provided in the ends of the casing 10 (Fig. 3).

Large wheels indicated generally at 18 are mounted on the hubs 15 and include the shock absorbing pneumatic tires 19 connected to the hub 15 by the spokes or radial members 20.

Any suitable clutch mechanism is provided for connecting at will the hubs 15 and wheels 18 to either the shaft 11 or to the casing 10. For example, a clutch member 21 (Fig. 3) of channel-shaped cross section is slidably keyed to the inner ends of the hubs 15 and is adapted for longitudinal movement relative thereto but adapted to rotate with the hub 15 upon rotational movement of the latter by means of the keyway and groove formations 22, as will be obvious. The clutch member 21 is controlled, as shown in Figure 5, by the prongs 23 which adapt the clutch member to be moved to engagement with the plate 24 fixedly carried by the shaft 11 whereby to connect the hubs 15 to the shaft or alternately to engagement with the end walls 13 of the casing whereby to connect the hubs to the casing 10.

A gondola 25 is rigidly suspended from the casing 10 by means of the telescopic supporting arms 26 and collars 27, in effect rotating the gondola about the shaft 11 in the manner of a swing.

Although in the drawing the vehicle has been shown as consisting of two wheels which turn upon a horizontal axle, it will be readily apparent that the invention is not limited thereto but may include single wheel, three wheel, or any number of wheel vehicles. Thus, the vehicle consists of four principal parts, namely the two wheels, the horizontal axis and the gondola with its suspension and its power plant. All of these parts, it will be noted, can turn on their bearings independently of each other and in the same plane, but all may be at will connected with each other by the clutches. The telescopic arms 26 will be controlled from the gondola as will the prongs 23. These arms extend to a length greater than that of the radius of the wheels when desired, and may be shortened or lengthened by means of ropes, cables or other mechanisms not shown. In its normal position when the vehicle is running, the gondola will hang about halfway up toward the axle, as shown in Fig. 1, while when the vehicle is at rest, it will usually be kept reposing on the ground or on the water to facilitate boarding and loading. Such means for shortening and lengthening the telescopic arms 26 and controlling the position of the prongs 23 are well known to those skilled in the art. One means for effecting adjustment of the position of the gondola is illustrated in Figures 6 and 7, wherein the telescopic arms 26 are shown to include an outer tubular member 26a and an upwardly extensible rod member 26b which is integral with the bearing 27. The outer sleeve 26a slidably receives the lower end of the upper rod 26b, which rod 26b is provided with a series of gear teeth 26c in meshing engagement with a pinion 26d rotatably supported upon a shaft 26g carried by spaced apart brackets 26h integral with diametrically opposite sides of the tubular member 26a. A handle 26e is connected to the shaft 26g that supports the spur gear 26d so as to selectively adjust the relative positions of the rod 26b within the tubular member 26a. A suitable retractable pawl 26k provides means for selectively locking the telescopic leg or support assembly to any desired adjusted position.

In operation, when it is desired to put the vehicle into motion, the gondola will be raised and the power plant 14 will be made to drive the shaft 11. Upon engagement of the clutch 21 with plate 24, this driving motion will result in the gondola 25 being swung, according to the sense of the rotation imparted to the axle, forward or backward of its normal vertical hanging position. As this is happening, the force of gravity will immediately exert itself to swing the gondola back to its former position. However, the wheels 18 being connected to the axle 11, the retrogressive motion of the gondola must bring about a forward or backward motion of the wheels and as a consequence of the vehicle itself. If the power plant 14 continues turning the axle 11, it will constantly tend to keep the gondola 25 ahead or back of its normal position, while gravity will always try to pull it back into its normal one. As a result, the vehicle will move on, increasing its speed with the increase of the motor's revolutions.

The vehicle can be steered by disengaging the clutch between the axle and the wheel towards which the turn is intended. Or, if the turn is to be a sharp one, by engaging thereafter the clutch between the same wheel and the casing 10. In the latter manner a turn can be achieved on a spot because one wheel will move forward, the other moving backward. Playing with the clutches will, of course, be necessary to keep the vehicle on a straight course, although it will show itself a remarkable tendency to remain in a straight path.

The speed of the vehicle can be decreased by discontinuing or reducing the application of power to axle 11 or by disengaging the connection between the wheels and the axle and connecting the wheels with the casing 10 of the gondola. In the latter case, the wheels will swing the gondola into a position back of the direction of the vehicle's motion, and the force of gravity working on the gondola will tend to stop the wheels. The braking effect will be especially powerful if at the same time the suspension is lengthened somewhat. For a quick stop in case of need the gondola can be lowered until it touches the ground, thereby bringing the vehicle to a standstill in the manner of a ship's anchor. On bodies of water, the gondola will act as a drag anchor in such cases, as soon as it touches the water. As a last resort, even the anchor of the vehicle, which is normally only used when floating on water, can be dropped, be it on land or on water.

In running on water, the procedure is the same as outlined above. The floatability of the vehicle is assured by the suitable construction and dimensions of the wheels and notably by the ring-shaped floats 29 built into them. Its mobility on the water is increased by the small paddles 28 associated therewith. The transition from running the vehicle on land to traveling on water and vice versa demands no other preparations than checking the speed somewhat to prevent splashing.

The gondola can be prevented from turning a complete somersault, which it would tend to do when used as a brake, by disengaging the clutches or loosening their grip as soon as the gondola has swung up about as high as the axle's level.

The advantages of the vehicle are obvious, the large wheels enabling it to be driven across roadless country, freshly plowed or even crop bearing fields, vineyards, puddles, ditches and shrubbery. Fords or bridges are unnecessary for crossing rivers or lakes. It can stay on the water for any time and should, thanks to its great stability, prove to be a good seagoing vessel. The absence of all undercarriage, steering gear, brakes, bumpers, differentials and most of the usual transmission reduces the total weight to such a point that the vehicle will be far less dangerous than cars or motorcycles or motor boats. The occupants themselves are fairly well protected against the effects of a collision by the wheels and the axle. The lack of all complicated and heavy parts and the simplicity of construction will result in a low cost of production and upkeep. The vehicle will provide an ideal means of locomotion for farmers, rangers, scouts, sea, lake and river side as well as desert dwellers, for fishermen, sportsmen of various kinds and for anyone living in a not too wooded country. In reduced size, it will qualify as an interesting toy in which most children will enjoy scooting about. Of course, the vehicle can be built in a simpler, lighter, cheaper form for use solely on land.

The vehicle will climb hills of a maximum gradient, which is roughly determined by the coincidence of the vertical projection of the loaded gondola's center of gravity in its forwardmost position, i.e., when the suspension is about horizontal, and of the line connecting the points where the wheels touch the ground. In theory, the vehicle should be able to climb any gradient which allows enough space for the center of gravity of the gondola to fall sufficiently outside of the perimeter of the wheels to counter-balance the weight of the rest of the vehicle. In practice, the limit in question would depend on many things, such as the strength and extensibility of the suspension and the power of the motor, on the gearing of the transmission, on the ratio between the weights of the gondola and the rest of the vehicle, on the adhesion of the wheels to the ground and on the skill of the driver. If, in climbing a slope, the gradient becomes too steep for the vehicle, then the gondola must be lowered until it touches the ground to keep the vehicle from running backward.

The same theoretical and practical considerations apply likewise to the descent. In descending, the pull of the force of gravity on the gondola will be used for a brake. If the slope becomes too steep for the desired braking effect, the gondola must be lowered to the ground.

While various changes may be made in the detail construction, it shall be understood that such changes shall be within the spirit and scope of the present invention as defined by the appended claims.

Having thus set forth and disclosed the nature of my invention, what is claimed is:

1. A vehicle comprising a hollow horizontal casing, a horizontal shaft rotatably mounted within said casing and extending outwardly to the opposite ends thereof, means mounted upon said casing for driving said shaft, a gondola, longitudinally extensible supports fixedly supporting said gondola on said casing, means for controlling the length of said supports, a pair of hubs, each of said hubs being rotatably mounted on the ends of said shaft, a clutch supported upon said hub within said casing having reciprocating means for selectively connecting said hubs with said casing and said shaft, and wheel means of relatively large diameter mounted on each of said hubs.

2. A vehicle according to claim 1, said wheel means comprising a pair of pneumatic shock absorbing tires, spokes connecting said tires with said hubs, ring shaped floats mounted between said spokes adjacent said shock absorbing tires, and paddle means mounted at the inner periphery of said floats whereby to adapt the vehicle for both land and water.

3. A vehicle according to claim 2, said clutch means comprising clutches keyed to said hubs but adapted for movement relative thereto, means for actuating said clutches into engagement with said casing whereby to connect said hubs with said casing or in the opposite direction against said shaft whereby to connect said hubs with said shaft.

4. A vehicle according to claim 3, said means for actuating said clutches comprising prongs actuable from the gondola.

5. A vehicle according to claim 4, said casing being of substantially cylindrical elongated shape, first bearing assemblies rotatably mounting said shaft within said casing and second bearing assemblies rotatably mounting said hubs on the ends of said shaft.

References Cited in the file of this patent

UNITED STATES PATENTS

| | | |
|---|---|---|
| 520,899 | Ronk | June 5, 1894 |
| 2,330,958 | Danforth | Oct. 5, 1943 |